United States Patent [19]

Rosas et al.

[11] Patent Number: 5,649,687
[45] Date of Patent: Jul. 22, 1997

[54] PULSE WIDTH MODULATED SOLENOID PURGE VALVE

[75] Inventors: Manuel D. Rosas, Coleta; Carolyn Klueg, Rochelle; Lawrence H. Burke, Oregon, all of Ill.

[73] Assignee: Borg-Warner Automotive, Inc., Sterling Heights, Mich.

[21] Appl. No.: 466,251

[22] Filed: Jun. 6, 1995

[51] Int. Cl.$^6$ .................................................. F16K 31/06
[52] U.S. Cl. ........................... 251/129.15; 251/129.05
[58] Field of Search ...................... 251/129.05, 129.15; 335/255, 279, 281; 123/520

[56] References Cited

U.S. PATENT DOCUMENTS

| | | |
|---|---|---|
| 4,442,998 | 4/1984 | Ohyama et al. ............... 251/129.15 X |
| 4,944,276 | 7/1990 | House et al. . |
| 4,986,246 | 1/1991 | de Vivie et al. . |
| 5,237,980 | 8/1993 | Gillier . |
| 5,326,070 | 7/1994 | Baron ............................. 251/129.15 |
| 5,538,219 | 7/1996 | Osterbrink .................. 251/129.05 X |

*Primary Examiner*—Kevin Lee
*Attorney, Agent, or Firm*—Reising, Ethington, Barnard & Perry, PLLC; Greg Dziegielewski

[57] ABSTRACT

A pulse width modulated solenoid purge valve for an on board fuel vapor recovery system of an automotive vehicle is operated by a solenoid that has a pole piece and armature that are shaped to operate at high frequencies. More specifically, the pole piece and the armature have an air gap interface that is defined by a protrusion of one that always intrudes into a recess of the other by a substantial amount to reduce response time of the armature and permit operation of the solenoid at the high frequencies.

7 Claims, 1 Drawing Sheet

PULSE WIDTH MODULATED SOLENOID PURGE VALVE

BACKGROUND OF THE INVENTION

This invention relates generally to fuel vapor recovery systems and more particularly to a pulse width modulated solenoid purge valve for an on board fuel vapor recovery system of an automotive vehicle.

An on board fuel vapor recovery system employs a charcoal filled vapor canister that stores fuel vapor vented from the fuel tank of the automotive vehicle. The canister is connected to the intake manifold of the vehicle engine so that the stored vapor is drawn into the engine and combusted during engine operation.

The rate at which stored vapor is drawn into the vehicle engine for combustion must be controlled precisely to avoid overly enriched fuel mixtures as controlled by the carburetor, fuel injectors or other charge forming devices of the vehicle engine. In order to control flow from the storage canister to the intake manifold in a precise manner, on board fuel vapor recovery systems employ a purge valve.

Purge valves for an on board fuel vapor recovery system are commonly operated by a solenoid that is under the control of a computer programmed to open and close the valve at an intermittent rate determined by various operating characteristics monitored by the computer. Essentially, the computer functions to open the valve at a cyclic frequency, which may be varied by the computer, for a selected portion of each cycle (the duty cycle), which may also be varied by the computer. Thus the typical control strategy for a solenoid operated purge valve comprises energizing the coil of the solenoid by a pulse width modulated signal from an electrical circuit that is controlled by the programmed computer. The extent to which the solenoid operated purge valve opens is related to the duty cycle of the modulation.

In the past these pulse width modulated solenoid purge valves included a pole piece and an armature that had flat confronting faces at an air gap that separated them. See for instance, U.S. Pat. No. 4,944,276 granted to William J. House et al Jul. 31, 1990. The air gap shape configuration typified by the House patent produces a relatively slow response time of the armature when the coil of the solenoid is energized. Consequently, these known pulse width modulated solenoid purge valves are operated at a relatively low frequency of about 5 Hertz or cycles per second.

U.S. Pat. No. 5,237,980 granted to William C. Gillier Aug. 24, 1993 discloses an on-board fuel vapor recovery system having a pulse width modulated solenoid purge valve. This purge valve has a step incorporated into the confronting faces of the armature and pole piece at their interface across the air gap. According to the Gillier patent, this step assists in damping the motion of the armature to cure an irregularity that might otherwise be present in the flow characteristic of the system. This step however, does not decrease the response time of the armature significantly. Consequently, the purge valve disclosed in this patent is still operated at a relatively low frequency.

SUMMARY OF THE INVENTION

The object of this invention is to provide a pulse width modulated solenoid purge valve that can be operated at a significantly higher frequency than known purge valves, for example on the order of 200 hertz or cycles per second.

A feature of the invention is that the solenoid purge valve has a pole piece and an armature that are shaped for operation at a relatively high frequency.

Another feature of the invention is that the solenoid purge valve has a pole piece and an armature that are specially shaped at their interface across an air gap to reduce the response time of the armature when the coil of the solenoid is energized so that the purge valve can be operated at a relatively high frequency.

Still another feature of the invention is that the solenoid purge valve has an air gap interface between the pole piece and the armature that is provided by a protrusion of one that is always disposed in a recess of the other to provide a more constant and linear magnetic force at higher frequencies.

Still another feature of the invention is that the solenoid purge valve has pole piece that has a protrusion and an armature that has a recess in which the protrusion is always disposed to provide a constant air gap between the pole piece and the armature.

Yet another feature of the invention is that the solenoid purge valve has a elastomeric valve head that is carried on a reduced diameter nib of the armature to accommodate irregularities in the valve seat.

BRIEF DESCRIPTION OF THE DRAWINGS

The above and, other objects, features and advantages of the invention will become more apparent from the following description taken in conjunction with the accompanying drawing wherein like references refer to like parts and wherein.

DESCRIPTION OF THE INVENTION

Figure 1:
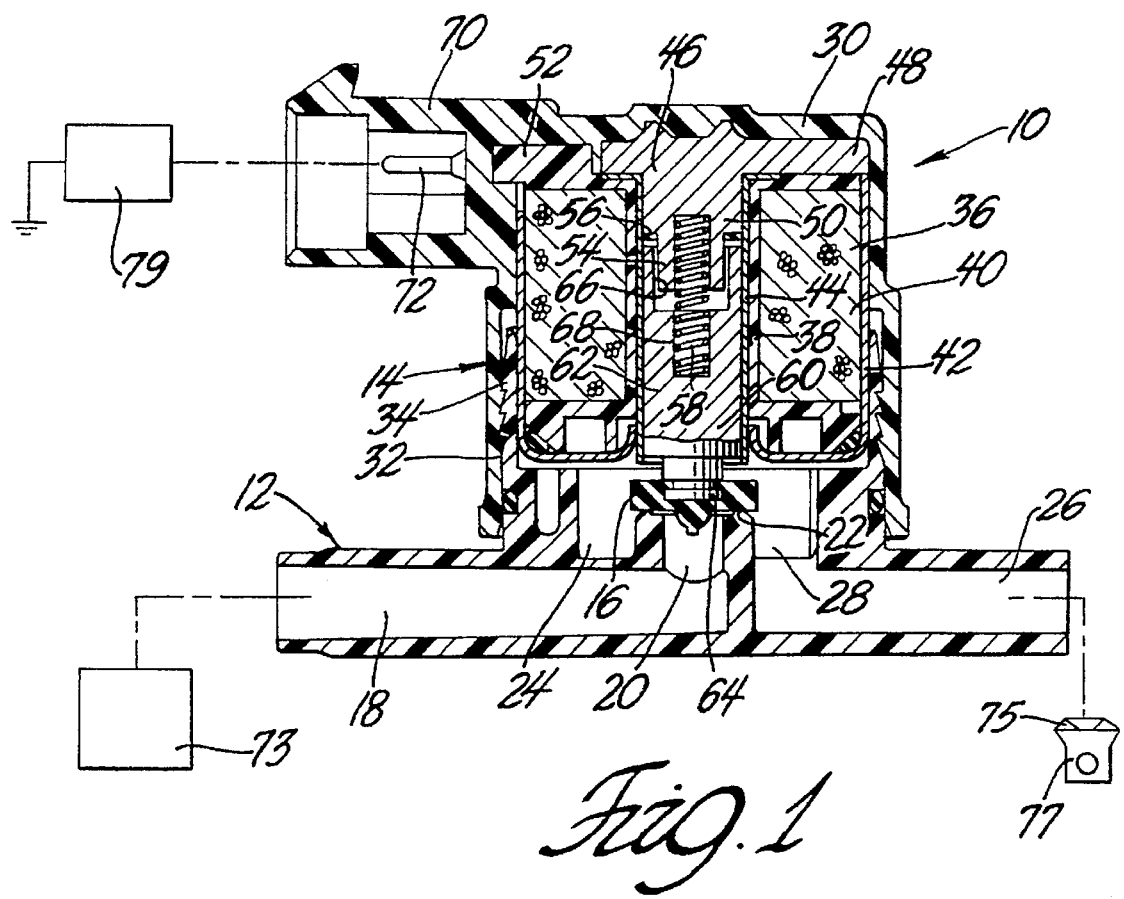
FIG. 1 is a sectioned side view of a solenoid purge valve in accordance with the invention.

Referring now to the drawing, FIG. 1 illustrates a solenoid purge valve 10 in accordance with the invention. The purge solenoid valve 10 comprises a valve body 12 of suitable plastic material and a solenoid assembly 14 that is attached to the valve body 12 for operating a moveable valve head 16 so as to control flow through the valve body 12.

The valve body 12 comprises an inlet conduit 18 that communicates with a central vertical passage 20 inside the valve body 12. The valve body 12 has an annular valve seat 22 at the outlet of passage 20 that cooperates with the valve head 16 for controlling flow through the passage 20. Briefly, the valve head 16 engages the valve seat 22 as shown in FIG. 1 to block flow through the passage 20 and is raised above the valve seat 22 from the position shown in FIG. 1 to allow flow through the passage 20.

The valve body 12 further includes an annular chamber 24 that communicates with the passage 20 when the valve head 16 is moved away from the valve seat 22 so that fluid flows through the passage 20 and into the chamber 24 via the gap between the valve heat 16 and the valve seat 22. The chamber 24 is concentric with the vertical passage 20 and has an open top that is closed when the solenoid assembly 14 is attached to the valve body 12 as shown in FIG. 1.

The valve body 12 includes an outlet conduit 26 and a second vertical passage 28 that connects the bottom of chamber 24 with the outlet conduit 26. Passage 28 is eccentrically arranged with respect to the passage 20 and chamber 24 and establishes constant communication between the chamber 24 and the outlet conduit 26 in the embodiment that is shown in FIG. 1.

The solenoid assembly 14 comprises a housing 30 of suitable plastic. The housing 30 is generally cup shaped and has a flexible annular wall 32 that interlocks with a flexible annular wall 34 of the valve body 12 to attach the solenoid assembly 14 to the valve body 12.

The solenoid assembly 14 includes an electric coil 36 that comprises a spool 38 of suitable plastic and a wire 40 of copper or other suitable electrically conductive material that is wound on a hollow shaft of the spool 38 between two end plates. The hollow shaft of the spool 38 is lined with a brass sleeve 44 that has a flange at the upper end that is disposed in a shallow recess in the upper end plate of the plastic spool 38.

The coil 36 is disposed in a metal canister 42 that engages the interior side wall of the solenoid housing 30 above the flexible annular wall 32. The lower end of the brass sleeve 44 that lines the hollow shaft of the plastic spool 38 protrudes through an inturned annular flange in the bottom of the metal canister 42.

The solenoid assembly 14 also includes a pole piece 46 of magnetic material such as soft iron, etc. The pole piece 46 has an upper flange 48 that engages the upper end plate of the plastic spool 38 and a stem 50 that is disposed in the upper part of the brass sleeve 44 that is inside the electric coil 36. The flange 48 traps the flange of the brass sleeve 44 in the recess in the upper end plate of the plastic spool 38. The flange 48 includes a radial slot that receives a radial boss 52 on the upper end plate of the spool 38 so that the pole piece 46 does not rotate with respect to the coil 36.

The lower end of the pole piece 46 is specially shaped to permit high frequency operation of the solenoid assembly 14 as more fully explained below. The special shape comprises a concentric, circular cylindrical protrusion 54 of reduced diameter at the lower end of the pole piece stem 50. This protrusion 54 forms an annular stop shoulder and a washer 56 of rubber or other suitable elastomeric material is mounted on the protrusion 54 in abutment with the stop shoulder. This elastomeric washer 56 reduces noise in the event that the pole piece 46 is engaged by the armature described below. The lower end of the pole piece 46 also has a concentric bore that receives the upper end of a coil spring 58 that extends through the annular protrusion 54.

The solenoid assembly 14 further comprises an armature 60 of magnetic material that is slideably disposed in the brass sleeve 44 which reduces the friction on the armature 60 when it reciprocates in the brass sleeve 44. The armature 60 has a circular cylindrical body 62 that has a concentric nib 64 at the lower end for carrying the valve head 16. The valve head 16 is made of rubber or other suitable elastomeric material and it is held in place on the nib 64 by a circular rib of the valve heat 16 that engages in a circular groove in the nib 64. The diameter of the nib 64 is substantially less that the inner diameter of the annular valve seat 22 so that the annular valve seat 22 is engaged by a flexible portion of the valve head 16. This provides a good seal when the valve head 16 is closed because the valve head 16 flexes and adjusts for any misalignments or irregularities in the valve seat 22.

The upper end of the armature 60 is specially shaped to cooperate with the pole piece 46 described above. This special shape comprises a concentric, circular cylindrical recess 66 at the upper end of the armature 60 that receives the cylindrical protrusion 54 of the pole piece 46. The armature 60 also has a concentric cavity 68 below the recess 66 that receives the lower end of the coil spring 58. The coil spring 58 biases the armature 60 away from the pole piece 46 and thus also biases the valve head 16 downwardly into engagement with the valve seat 22.

The coil 36, brass sleeve 44, pole piece 46 and canister 42 are preferably assembled with an O-ring seal at the inside corner of the canister 42. This subassembly is then insert molded in the plastic housing 30 of the solenoid assembly 14. The molded plastic housing 30 includes an integral socket connector 70 that houses insert molded terminals 72 that are connected to the ends of the electric coil 36. After the plastic housing 30 is molded, the coil spring 58 and the armature 60 with the valve head 16 attached to the nib 64 are inserted in the brass sleeve 44 to complete the solenoid assembly 14. The solenoid assembly 14 is then attached to the valve body 12 to complete the purge valve 10.

When the purge valve 10 is incorporated in a fuel vapor recovery system, the inlet conduit 18 is connected to a vapor canister 73, the outlet conduit 26 is connected to an intake manifold 75 of an engine 77 and the solenoid assembly 14 is connected to a computer controlled electrical power source 79 as illustrated schematically in FIG. 1. The computer controls the power source 79 so that a modulated high frequency electric current is fed to the coil 36 of the solenoid assembly 14 in a programmed manner so that the armature 60 reciprocates in the brass sleeve 44 moving the valve head 16 back and forth toward and away from the valve seat 22. This is and can be done at a very high frequency due to the special shape of the interfacing portions of the pole piece 54 and the armature 60.

More specifically, as indicated above, the pole piece 46 has a protrusion 54 that is disposed in a recess 66 of the armature 60. As can be seen from FIG. 1, the protrusion 54 intrudes into the recess 66 by a substantial amount when the valve head 16 engages the valve seat 22. This intrusion increases when the valve head 16 is lifted away from the valve seat 22 and consequently the protrusion 54 of the pole piece always intrudes into the recess 66 of the armature by a substantial amount.

In the example illustrated in FIG. 1, the intrusion is approximately 0.200 inches when the valve head 16 engages the valve seat 22. In this condition the axial gap between the top of the armature 60 and the elastomeric washer 56 in the direction of movement of the armature 60 is approximately 0.070 inches so that the intrusion could be as much as 0.270 inches if the armature when permitted to bottom out on the washer 56. The radial gap between the protrusion 54 and the recess 66 is approximately 0.002 inches.

Hence it can be seen that the protrusion 54 of the pole piece 46 always intrudes into the recess 66 of the armature 60 by a substantial amount. Consequently the response of the armature 60 is much quicker at higher frequencies because the armature 60 is always in the magnetic circuit. Moreover, radial air gap between the protrusion 54 of the pole piece 46 and the recess 66 of the armature 60 is constant.

The high frequency pulse width modulated solenoid purge valve described above will operate at a high frequency of up to 200 hertz or cycles per second with a low current draw of less than 600 milliamps. It is also believed that a purge valve having a minimum intrusion of approximately 0.100 inches will also operate under the same conditions. As the duty cycle increases, the coil 36 pulls the armature 60 further up against the force of spring 58 and valve head 16 further away from the valve seat 22 so that the flow through the purge valve 10 is substantially linearly proportional to the duty cycle.

The duty cycle controls the distance that the valve head 16 is pulled away from the valve seat 22 so that the flow through the purge valve 10 is controlled according to the duty cycle. Due to the special shape at the air gap interface of the pole piece 46 and the armature 60 and the high frequency operation, the armature 60 floats back and forth between the valve seat 22 and the washer 56. The stroke of the armature 60 changes as the duty cycle changes, however, the armature 60 does not contact the pole piece 46 due to the high frequency operation and the floating nature of the armature stroke. Thus the possibility of the armature 60 hanging up on the pole piece 46 is avoided.

Figure 2:
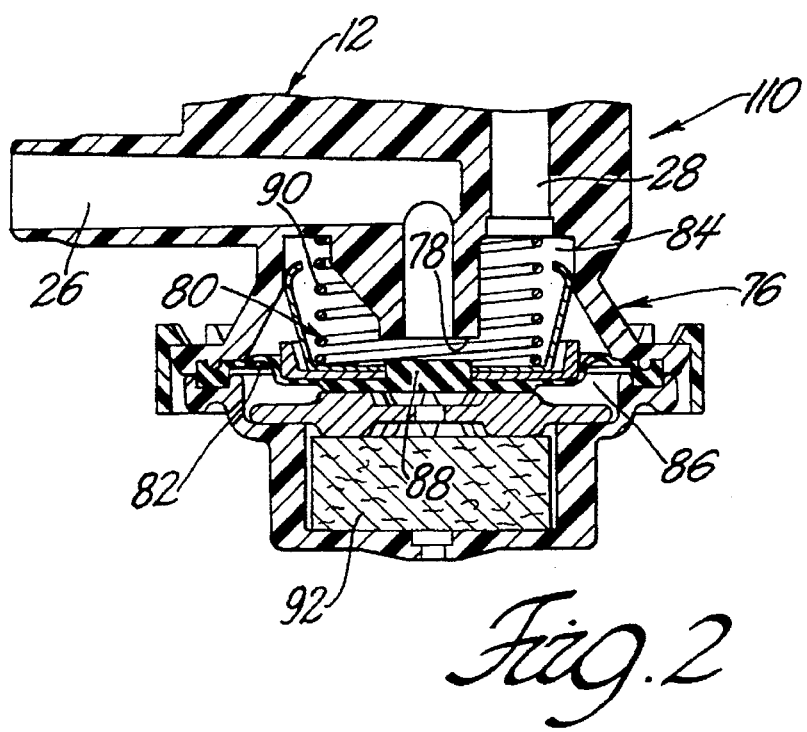
FIG. 2 is a sectioned partial side view of a modified form of a solenoid purge valve in accordance with the invention.

FIG. 2 shows a modified form of purge valve 110 which is like the purge valve 10 except for the inclusion of a vacuum regulator 76 in the valve body. Vacuum regulator 76 delivers vacuum to the chamber 24 via an elongated vertical passage 28 that is regulated to a reasonably steady value despite wider variations in the actual manifold vacuum that is delivered to the outlet conduit 26. In the purge valve 110 the outlet conduit 26 extends into valve housing 12 via a vertical passage that terminates in an annular valve seat 78. Vacuum regulator 76 includes a diaphragm operated valve mechanism 80 comprising a diaphragm 82 which divides a lower portion of the valve housing 12 into two chambers 84 and 86 on opposite sides of the diaphragm. A central region of the diaphragm carries a valve element 88 that coacts with the valve seat 78. The diaphragm is resiliently biased by a coil spring 90 so that valve element 88 is urged away from valve seat 78. Chamber 84 communicates with manifold vacuum while chamber 86 is vented to atmosphere via a chamber that has a replaceable filter 92. The pressure differential between actual manifold vacuum and atmosphere acting on the diaphragm 82 positions the valve element 88 relative to the valve seat 78 so that the vacuum in chamber 84 is regulated to a reasonably steady value despite fluctuations in actual manifold vacuum. This in turn maintains a steadier differential across the open purge valve and the possibility for making the purge valve flow characteristics less sensitive to manifold vacuum variations over the regulation range.

The invention has been described in an illustrative manner, and it is to be understood that the terminology which has been used is intended to be in the nature of words of description rather than of limitation.

Obviously, many modifications and variations of the present invention in light of the above teachings may be made. It is, therefore, to be understood that, within the scope of the appended claims, the invention may be practiced otherwise than as specifically described.

The embodiments of the invention in which an exclusive property or privilege is claimed are defined as follows:

1. A pulse width modulated solenoid purge valve comprising:

a valve body having an inlet conduit, an outlet conduit and a moveable valve head controlling the flow between the inlet conduit and the outlet conduit, and a solenoid for reciprocating the moveable valve head at a high frequency, the solenoid having a pole piece and a moveable armature that is operatively connected to the moveable valve head, the pole piece and the armature having an air gap interface that is defined by a protrusion of one that always intrudes into a cylindrical recess of the other by a substantial amount so as to reduce response time of the armature and permit operation of the solenoid at the high frequency and the armature being spaced from the pole piece by a gap in the direction of movement of the armature that is substantially less than the distance that the protrusion intrudes into the recess when the purge valve is closed.

2. The pulse width modulated solenoid purge valve as defined in claim 1 wherein the protrusion intrudes into the recess by a substantial amount so as to reduce response time of the armature and permit operation of the solenoid at a high frequency of up to about 200 hertz.

3. The pulse width modulated solenoid purge valve as defined in claim 1 wherein:

the protrusion intrudes into the recess at least 0.100 inches; and the protrusion is spaced from the recess by a radial gap of about 0.002 inches.

4. The pulse width modulated solenoid purge valve as defined in claim 1 wherein:

the protrusion intrudes into the recess approximately 0.200 inches; and the protrusion is spaced from the recess by a radial gap of about 0.002 inches.

5. The pulse width modulated solenoid purge valve as defined in claim 1 wherein:

the pole piece has the protrusion and the armature has the recess that receives the protrusion of the pole piece to establish the air gap at the interface of the armature and the pole piece.

6. The pulse width modulated solenoid purge valve as defined in claim 1 wherein:

the protrusion is spaced from recess by a radial gap that is substantially less than the gap in the direction of movement of the armature.

7. The pulse width modulated solenoid purge valve as defined in claim 1 wherein:

the moveable valve head is elastomeric and attached to a nib of the armature; and the moveable valve head engages an annular valve seat that has an inner diameter that is larger than the outer diameter of the nib so that the valve seat is engaged by a flexible portion of the moveable valve head.

\* \* \* \* \*